United States Patent
Hammar et al.

[11] Patent Number: 5,933,396
[45] Date of Patent: Aug. 3, 1999

[54] STORAGE AND RETRIEVAL LIBRARY WITH SIDE-BY-SIDE STORAGE CELLS

[75] Inventors: Jerry Walter Hammar; John Edward Kulakowski; Rodney Jerome Means; Chi-Hung Dang, all of Tucson, Ariz.

[73] Assignee: International Business Machines Corporation, Armonk, N.Y.

[21] Appl. No.: 08/852,302

[22] Filed: May 7, 1997

[51] Int. Cl.⁶ ............................. G11B 17/22; G11B 15/68
[52] U.S. Cl. .............................. 369/36; 369/178; 360/92
[58] Field of Search ...................... 369/34, 36, 38, 369/178, 179, 191, 192; 360/92, 98.04, 98.05, 98.06

[56] References Cited

U.S. PATENT DOCUMENTS

| | | | |
|---|---|---|---|
| 5,128,912 | 7/1992 | Hug et al. | 369/38 |
| 5,255,251 | 10/1993 | Fitzgerald et al. | 369/36 |
| 5,274,516 | 12/1993 | Kakuta et al. | 360/90 |
| 5,303,214 | 4/1994 | Kulakowski et al. | 369/34 |
| 5,537,371 | 7/1996 | Niederlein et al. | 369/36 |
| 5,546,366 | 8/1996 | Dang | 369/36 |
| 5,631,785 | 5/1997 | Dang et al. | 360/92 |
| 5,659,444 | 8/1997 | Dang et al. | 369/36 |
| 5,731,926 | 3/1998 | Gallo et al. | 369/36 |

FOREIGN PATENT DOCUMENTS

| | | | |
|---|---|---|---|
| 444715 | 9/1991 | European Pat. Off. | 369/34 |
| 60-236147 | 11/1985 | Japan | 369/36 |
| 1-50275 | 2/1989 | Japan | 369/36 |
| 4-95262 | 3/1992 | Japan | 369/34 |
| 5-144156 | 6/1993 | Japan | 369/178 |
| 92/09989 | 6/1992 | WIPO | 369/36 |
| 94/22140 | 9/1994 | WIPO | 369/178 |

*Primary Examiner*—David L. Ometz
*Attorney, Agent, or Firm*—John H. Holcombe; Robert M. Sullivan

[57] ABSTRACT

A storage and retrieval library has a column of storage cells including at least some side-by-side storage cells. A media accessor with a picker gripper for accessing media in one side of the side-by-side cells is rotatable about a pivot to an opposed position for accessing media in the other side of the side-by-side cells. For multi-sized media, a column may have storage cells extending the full width of the column for holding a large sized media, and a second type of smaller cells arranged side-by-side, each for holding a small sized media. A media picker has a first gripper for accessing large sized media from the full width cells, and a second gripper for accessing small sized media from one side of the side-by-side cells. The media picker is rotatable about a pivot to an opposed position for the second gripper for accessing small sized media from the other side of the side-by-side cells.

20 Claims, 9 Drawing Sheets

STORAGE AND RETRIEVAL LIBRARY WITH SIDE-BY-SIDE STORAGE CELLS

TECHNICAL FIELD

This invention relates to storage and retrieval libraries, and, more particularly, to the storage of media in side-by-side storage cells for access by a single accessor with a single, fixed picker, and is advantageously employed in multimedia libraries with multi-sized media.

BACKGROUND OF THE INVENTION

Storage and retrieval libraries are designed to maximize storage capacity, in terms of the greatest number of media, in the smallest space, or footprint. Previously, the media would be identical and stored in one or more columns or rows of storage cells, and an accessor would move along the column or row to access the media and transport the media between the storage cells and a read/write station.

With the advent of multimedia libraries, the media is no longer identical, and the columns or rows may be of sufficient size to accommodate the largest media. Thus, the storage of small sized media in such a multimedia library wastes a considerable portion of the potential storage space.

An example of a multimedia library which is able to store both multi-sized media is illustrated in coassigned U.S. Pat. No. 5,303,214. As illustrated in the '214 patent, the larger media are approximately twice the width of the smaller media. Thus, in order to save space, the large sized media are arranged in one set of cells in one set of rows, and the small sized media are arranged in another set of cells in another set of rows, and the library is provided with separate picker grippers, a large size picker gripper capable of grasping the large sized media from rows which are wide and therefore widely spaced, and a small size picker gripper capable of grasping the small sized media from rows which are more closely spaced. The variable spacing of the rows requires a costly accessor which can access the variously spaced rows.

The most prevalent storage and retrieval libraries are those which store optical media or which store tape media. In many instances of media used in such libraries, the optical media is larger than the tape media, and typically, the optical media is approximately twice the width of the tape media. In a multimedia library, having optical and tape media, the more common arrangement is therefore likely to have optical media in the library which is twice the width of the tape media in the library.

It would be advantageous to have columns or rows of a common width for storage cells for both optical and tape media and to have a common accessor for accessing both media, the accessor having one picker gripper for accessing the larger (optical) media and another picker gripper on the same accessor for accessing the smaller (tape) media, which would be stored in cells at a common spacing to reduce the cost of the accessor.

SUMMARY OF THE INVENTION

Disclosed is storage and retrieval library having a column of storage cells including at least some side-by-side storage cells. A media accessor with a picker gripper for accessing media in one side of the side-by-side cells is rotatable about a pivot to an opposed position for accessing media in the other side of the side-by-side cells. For multi-sized media, a column may have storage cells extending the full width of the column for holding a large sized media, and a second type of smaller cells arranged side-by-side, each for holding a small sized media, and a media picker having a first gripper for accessing large sized media from the full width cells, and having a second gripper for accessing small sized media from one side of the side-by-side cells, and the media picker is rotatable about a pivot to an opposed position for the second gripper to access small sized media from the other side of the side-by-side cells.

For a fuller understanding of the present invention, reference should be made to the following detailed description taken in conjunction with the accompanying drawings.

DETAILED DESCRIPTION OF THE INVENTION

Figure 1:
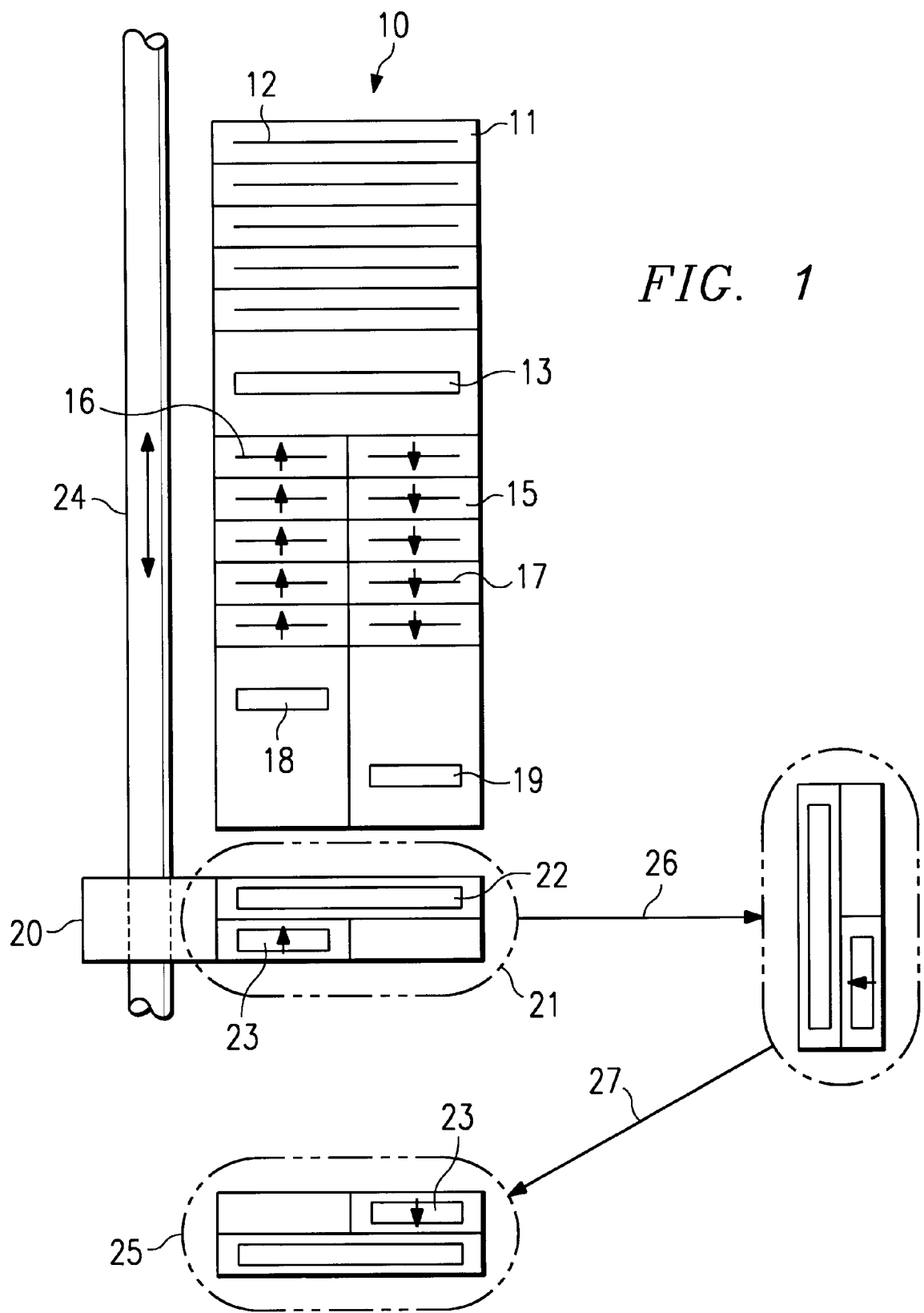
FIG. 1 is a diagrammatic representation of a column of storage cells, cartridges, drives and accessor of a library of the present invention.

FIG. 1 illustrates one embodiment of the present invention, comprising a column 10 of large sized storage cells 11 for storing large sized media 12, e.g., optical disk cartridges, and a read/write drive 13 for reading and/or writing data on the large sized media. A plurality of side-by-side small sized storage cells 15 store small sized media 16 and 17, e.g., tape cartridges, in, respectively, "up" and "down" positions as illustrated by the arrows. Read/write drives 18 and 19 are shown in, respectively, "up" and "down" positions for reading and/or writing data on the small sized media.

An accessor 20, mounts a picker mechanism, shown in the position illustrated by frame 21, with a large sized gripper 22 and small sized gripper 23. The accessor assembly 20 is mounted for vertical movement on vertical support 24. The accessor assembly accesses and moves large sized media 12 and small sized media 16 between the storage cells 11 or 15 and the respective drives 13, 18 and 19.

The present invention provides small sized storage cells 15 in a side-by-side arrangement so that the full width of the column 10 is utilized to store media. The large sized cells and the small sized storage cells are approximately equally spaced in the vertical direction. The present invention allows the use of only one gripper for each size of media, providing a substantial cost savings. Two tape grippers and two optical grippers may be mounted on the same picker mechanism at additional cost. To provide additional cost savings, only one small sized media read/write drive 18 may be provided and the space otherwise occupied by drive 19 used for additional small sized storage cells.

In accordance with the present invention, the picker mechanism gains access to the media 15 by "flipping" the picker from the position shown by the frame 21 to the position shown by frame 25 and the arrows 26 and 27. The picker mechanism is pivoted about a central pivot point so that gripper 23 is inverted and thereby moved from a first position in which to access media 16 to an opposed position in which to access media 17.

When in first position 21, the gripper 23 accesses the small sized media 16 for transporting the media to and from one of the drives 18 or 19. When in opposed position 25, the gripper 23 accesses the small sized media 17 for transporting the media to and from one of the drives 18 or 19. The picker mechanism must be in the first position for accessing drive 18 and in the opposed position for accessing drive 19.

In the lower cost version with only read/write drive 18, the gripper 23 will maintain position 21 for accessing media 16 for movement to the drive 18, and is "flipped" back from position 25 to position 21 after accessing media 17 after movement to the drive 18.

In the preferred embodiment, the picker may be oriented in either the normal position 21 or position 25 so that gripper 22 may access the large sized media 12 for movement to drive 13 in either position so that the drive may read and/or write on either side of the media. A gripper 22 may alternatively be provided that is arranged to move the large sized media in only one orientation for the case where only one side of the large sized media is used, or for the case where the drive 13 may read and/or write on both sides of large sized media 12. It will be appreciated by those of ordinary skill in the art that the accessor movement 24 must compensate for the orientation of gripper 22 in order to access the desired storage cell 11.

Figure 2:
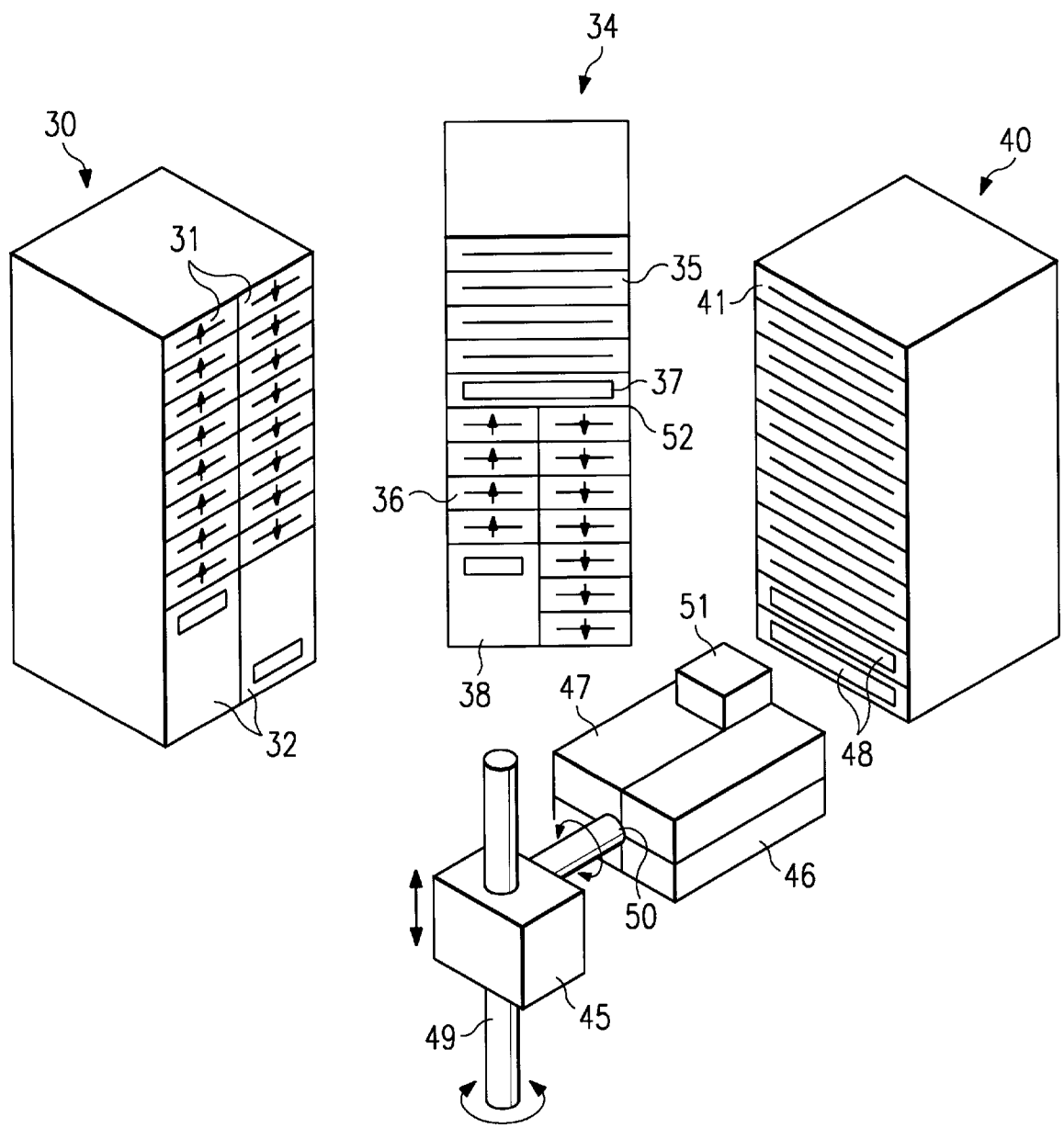
FIG. 2 is a diagrammatic representation of multiple columns of storage cells, cartridges, drive and accessor of a library of the present invention.

FIG. 2 illustrates a library with a plurality of columns of storage cells. Column 30 includes only small sized side-by-side storage cells 31 for storing small sized media in the "up" orientation in one side of the side-by-side cells and in the "down" orientation in the other side of the side-by-side cells. Two read/write drives 32 are illustrated in column 30.

Column 34 includes both large sized cells 35 for storing large sized media and small sized side-by-side cells 36 for storing small sized media. Read/write drives 37 and 38 are provided for reading and/or writing, respectively, large sized media and small sized media. Again, small sized media is stored in the up orientation in one side of the side-by-side cells 36 and in the down orientation in the other side of the side-by-side cells.

Column 40 comprises only the large size storage cells 41 for storing large sized media. Two read/write drives 48 are provided for reading and/or writing data on the large sized media.

An accessor 45 includes picker gripper 46 for accessing the large sized media and gripper 47 for accessing the small sized media. Accessor 45 is arranged to rotate about shaft 49 to move gripper 47 from column to column. The accessor 45 is also arranged to move vertically along the shaft 49 in order to transport media between the storage cells and the drives. Lastly, accessor 45 is arranged to rotate, or "flip", the picker about pivot 50 so that gripper 47 may access the small sized media from both the up orientation cells and the down orientation cells.

A bar code reader 51 is provided to read bar code labels on the media, and to read a marker 52 which may provide an accurate location for the accessor 45 to identify the location of the division between the large sized storage cells and the small sized side-by-side storage cells of the present invention. Marker 52 also provides a registration mark for the accessor to calibrate its precise position. The calibration is best conducted during the power on process.

Figure 3A:
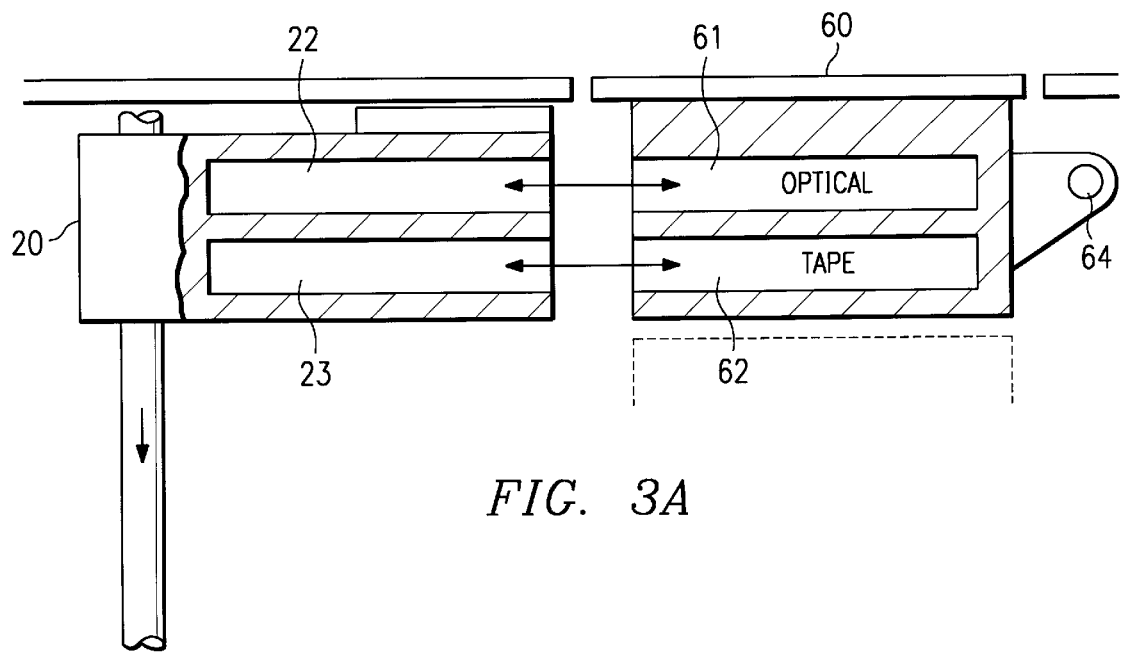
FIGS. 3A and 3B are diagrammatic representations of an input/output station for the libraries of FIGS. 1 and 2.
Figure 3B:
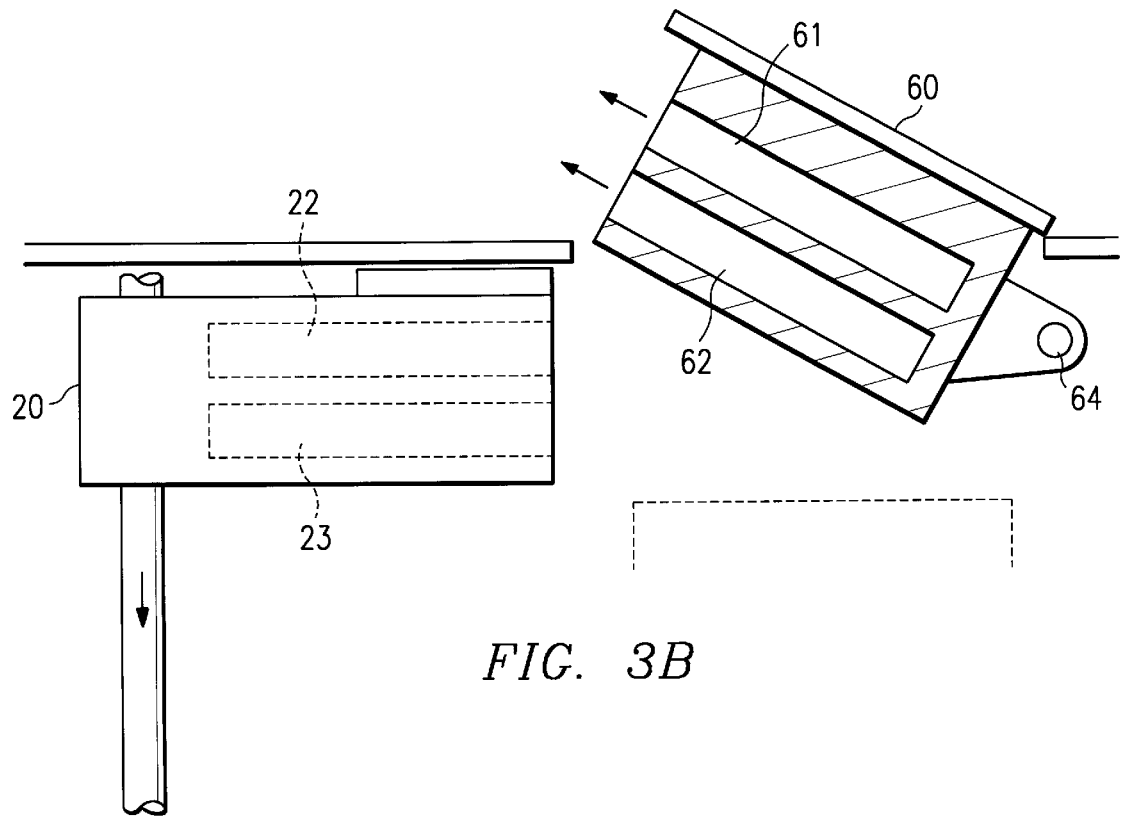

An embodiment of an input/output 60 station is illustrated in FIGS. 3A and 3B and is located, for example, at the top of a column of the library. The input output station comprises slot 61 for loading a large sized media, such as an optical disk cartridge, and slot 62 for loading a small sized media, such as a magnetic tape cartridge. In FIG. 3A, accessor 20 of the library of FIG. 1 is shown in position so that grippers 22 and 23 may load or unload cartridges to or from slots 61 and 62, respectively. The input/output station is mounted to the library at a pivot 64, so that, as illustrated in FIG. 3B, the input/output station may be pivoted so as to allow manual loading or unloading of cartridges. Other, similar input/output stations may be provided for the libraries of the present invention, and may be mounted at other suitable locations of the libraries. The accessor mechanism, such as accessor 20 will transport and deliver output cartridges from storage cells to the input/output station 60 and will transport input cartridges to the appropriate storage cells.

Figure 4:
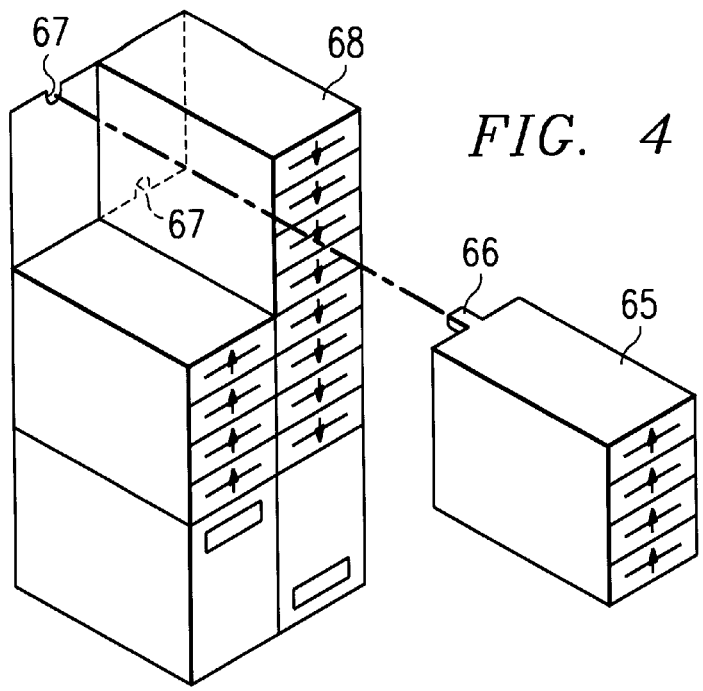
FIG. 4 is a diagrammatic representation of a column of a library of the present invention having modular cells.

FIG. 4 illustrates a modular system for adding or changing storage cells for the library. In the illustrated embodiment, the storage cells comprise interchangeable modules 65 having alignment pins 66 which engage alignment slots 67 in the library housing. The alignment slots 67 are arranged so that the modules can only be inserted in the proper arrangement, for example, module 65 must be oriented in the "up" orientation as shown by the arrows, and module 68 must be oriented in the "down" orientation. As an additional modular arrangement, small sized media storage cell modules 65 and 68 may be removed in favor of a single large sized module having alignment pins which engage both alignment slots 67.

Figure 5:
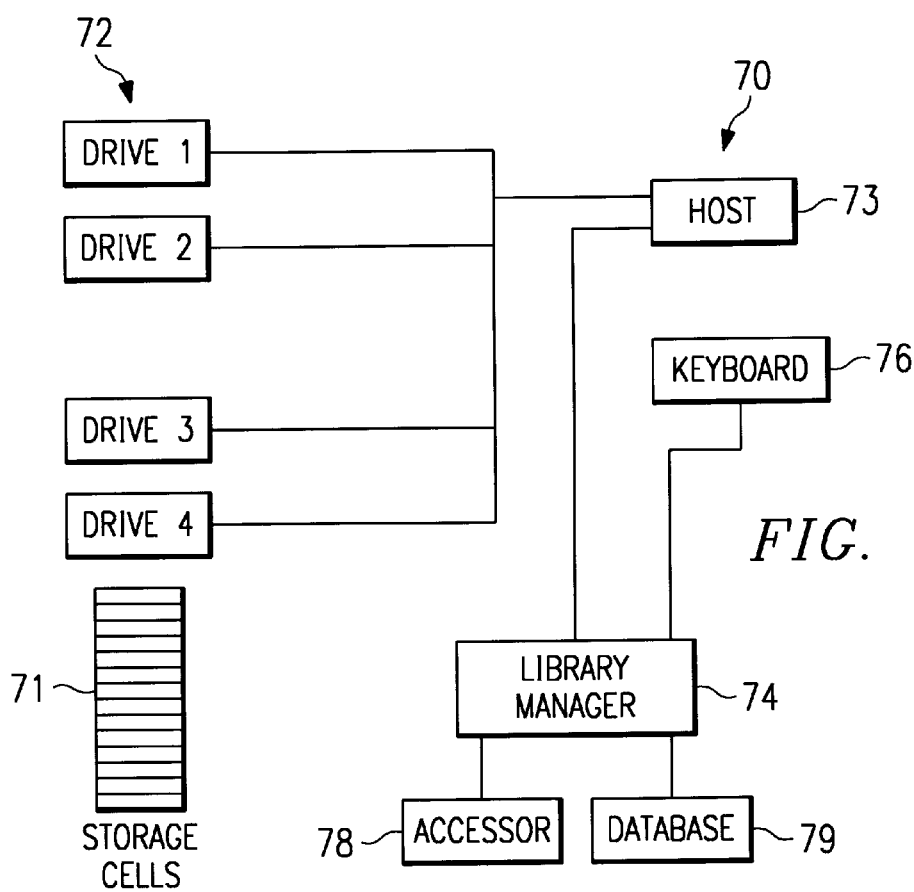
FIG. 5 is a block diagram of a library management system of the libraries of FIGS. 1 and 2.

A library management system 70 for the libraries of the present invention is illustrated in FIG. 5. The illustrated storage cells 71 and read/write drives 72 may comprise those of the library of FIG. 1 or of FIG. 2, or any other library of the present invention. The drives include controllers which may be connected directly to a host computer system 73 for reading and/or writing and the associated search functions, or may be indirectly connected to the host through a library read/write processor. The host 73 is directly connected to a library manager 74 for operating the library to access the desired data from the desired cartridge for storage cells 71. Library manager 74 comprises a data processing system, for example, a personal computer and associated operating system of the type that is commonly available, such as Microsoft Windows NT, and comprises a specialized application program for operating the library accessor 78. Such application programs are within the skill of those of ordinary skill in the art. The library program establishes a database 79, for example, in tables stored on the disk storage of the data processor, which tracks the data stored in the library and the media on which the data is stored. In addition, the database 79 tracks the media stored in the library by the addresses of the storage cells in which the media is located.

In accordance with the present invention, the storage cell addressing provides an indication of the orientation of the storage cells and/or of the media stored in the cells. Other means may be utilized for making the identification of the media orientation, such as by providing a special "orientation" bit associated with the address or separately in the table of the database 79.

As an example, "odd" addresses are used to designate small sized storage cells having media with an up orientation and to designate large sized cells (all of which may have an up orientation). In the example, "even" addresses are used to designate small sized storage cells having media with a down orientation. If the large sized media are optical disks which are two sided, "even" addresses may also be used to designate the reverse sides of the disks, so that they may be flipped for reading and/or writing in a read/write drive having a read/write head for only one side.

In an alternative example, one sequence of addresses (e.g., 0–49) may be used to designate small sized storage cells having media with an up orientation, another sequence (e.g., 50–99) may be used to designate small sized storage cells with a down orientation and a third sequence (e.g., 100–199) used to designate large sized cells. Current practice is to have the large media in a odd-even sequence.

Figure 6:
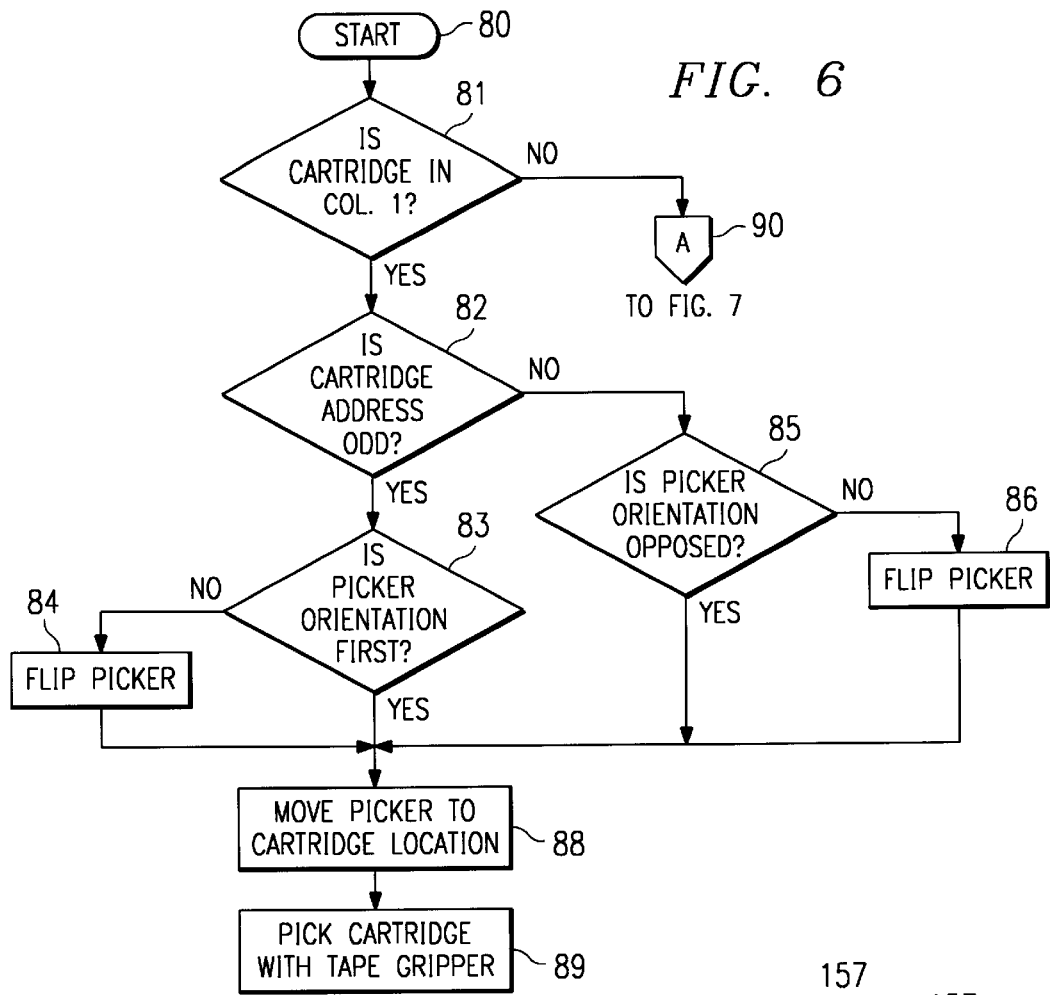
FIGS. 6 and 7 are flow diagrams of the accessor management system of the present invention.
Figure 7:
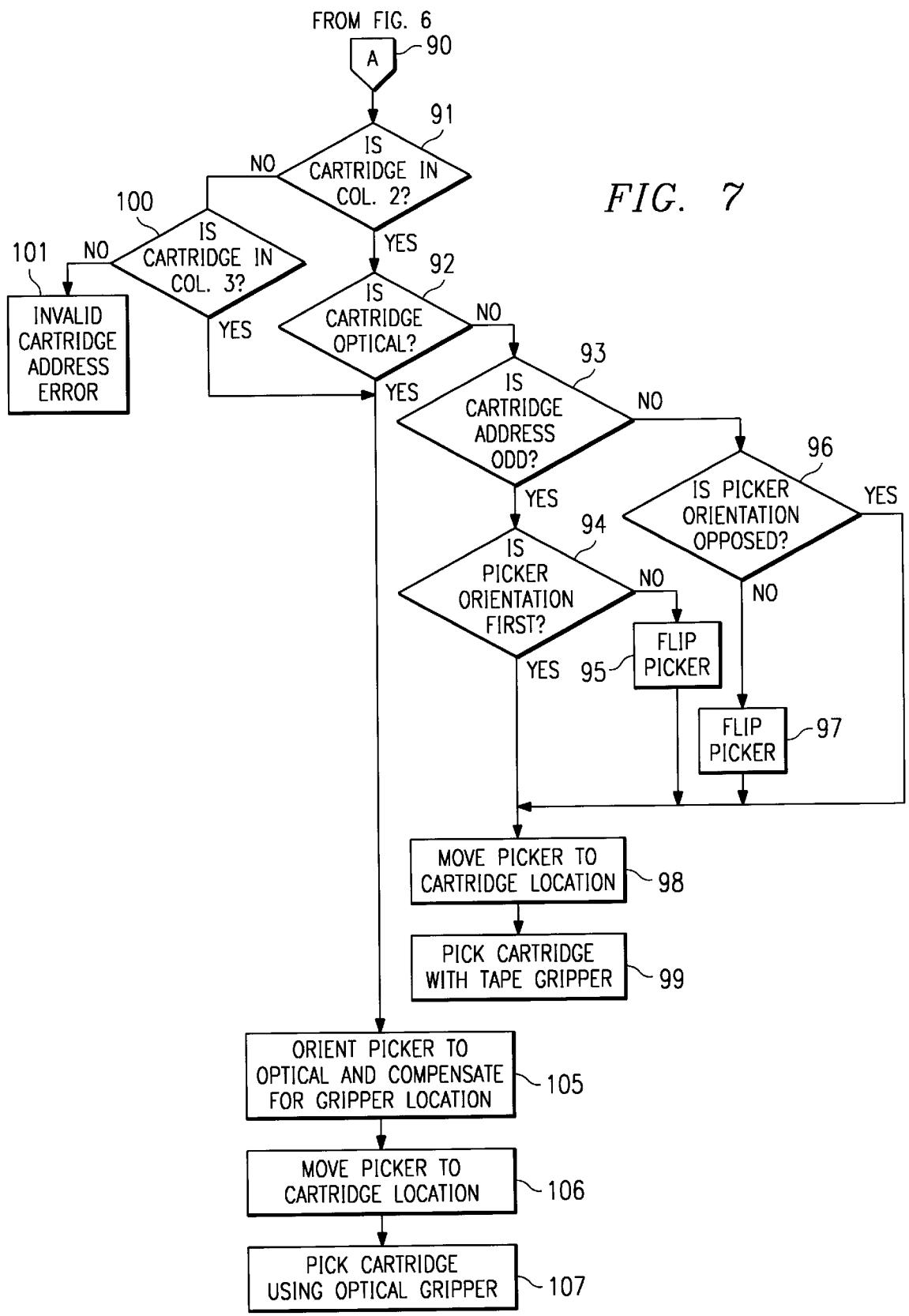

The flow charts of FIGS. 6 and 7 illustrate an embodiment of the method, implementable in the library management system 70 of FIG. 5, for operating the accessor and picker to achieve the proper orientation and to engage the correct gripper to access the desired cartridge for transport to an associated read/write drive.

For the purpose of illustration, the first addressing example is employed. The library management process of the flow chart of FIGS. 6 and 7 operates the multi-column library of FIG. 2. Upon entering the process of the flow chart upon an access request at step 80, the database 79 in FIG. 5 is accessed, and the address checked in step 81 to determine whether the requested data cartridge is in column 1 (column 30 in FIG. 2). If "Yes", the process determines in step 82 whether the cartridge address is odd. If so, step 83 determines whether the picker orientation is in the corresponding first or "up" orientation. If "No", step 84 flips the picker from the opposed or "down" to the first orientation. If step 82 determines that the cartridge address is instead even, step 85 determines whether the picker orientation is in the corresponding opposed or "down" orientation. If "No", step 86 flips the picker from the first to the opposed orientation.

As the result of steps 83 and 84, or 85 and 86, both the cartridge and the picker are in the same orientation so that the cartridge may be accessed. Therefore, in step 88, the picker is moved to the cartridge location and the cartridge picked with small sized media (tape) gripper 47 in step 89. The picker may be flipped as it is being moved to the cartridge location, rather than as a separate step.

If step 81 indicated that the cartridge address was not in column 1, step 90 indicates that process proceeds to the flow chart of FIG. 7. Step 91 determines whether the requested data cartridge is in column 2 (column 34 in FIG. 2). If "Yes", the requested cartridge may either be small sized and in a side-by-side storage cell, or be large sized and in a large storage cell. Thus, step 92 determines whether the cartridge is large sized (optical). If "No", the cartridge is therefore small sized and the method is identical to that with respect to that of column 1. Briefly, step 93 determines whether the cartridge address is odd, and, if so, step 94 determines whether the picker orientation is the corresponding up or first orientation. If "No", step 95 flips the picker from the down or opposed to the up orientation. If step 93 determines that the cartridge address is instead even, step 96 determines whether the picker orientation is the corresponding down or opposed orientation. If "No", step 97 flips the picker from the up to the down orientation. As the result of steps 94 and 95, or 96 and 97, both the cartridge and the picker are in the same orientation so that the cartridge may be accessed. Therefore, in steps 98 and 99, the picker is moved to the cartridge location and the cartridge picked with small sized media (tape) gripper 47.

If step 91 determines that the cartridge address is not in column 2, step 100 determines whether it is in column 3 (column 40 in FIG. 2). If the determination is "No", step 101 indicates that the supplied address is invalid. If the determination is that column 3 (column 40 in FIG. 2) was intended, the cartridge is a large size (optical) cartridge. Both step 92 and step 100 lead to step 105 for accessing the large size (optical) cartridge. Step 105 orients the picker to an optical cartridge and compensates the accessor positioning for accessing the optical gripper location. For the two sided optical disk and a one sided read/write drive, the picker orientation may be additionally to orient the picker so that the gripper accesses the correct side of the optical disk. The accessor compensation compensates the position of the accessor for the offset of the optical gripper in the up or the down position from that of the tape gripper. In steps 106 and 107, the picker is moved to the cartridge location and the large sized (optical) gripper picks the cartridge from the addressed storage cell. The cartridge may be flipped during the move to or from the drive and is not separately shown in the flow chart.

Upon picking the media cartridge in steps 89, 99 or 107, the cartridge is transported to the appropriate read/write drive and is oriented for reading and/or writing. Upon the completion of reading and/or writing the media cartridge, the process represented in the flow charts of FIGS. 6 and 7 is reversed in order to transport the read and/or written cartridge to the addressed storage cell.

Figure 8:
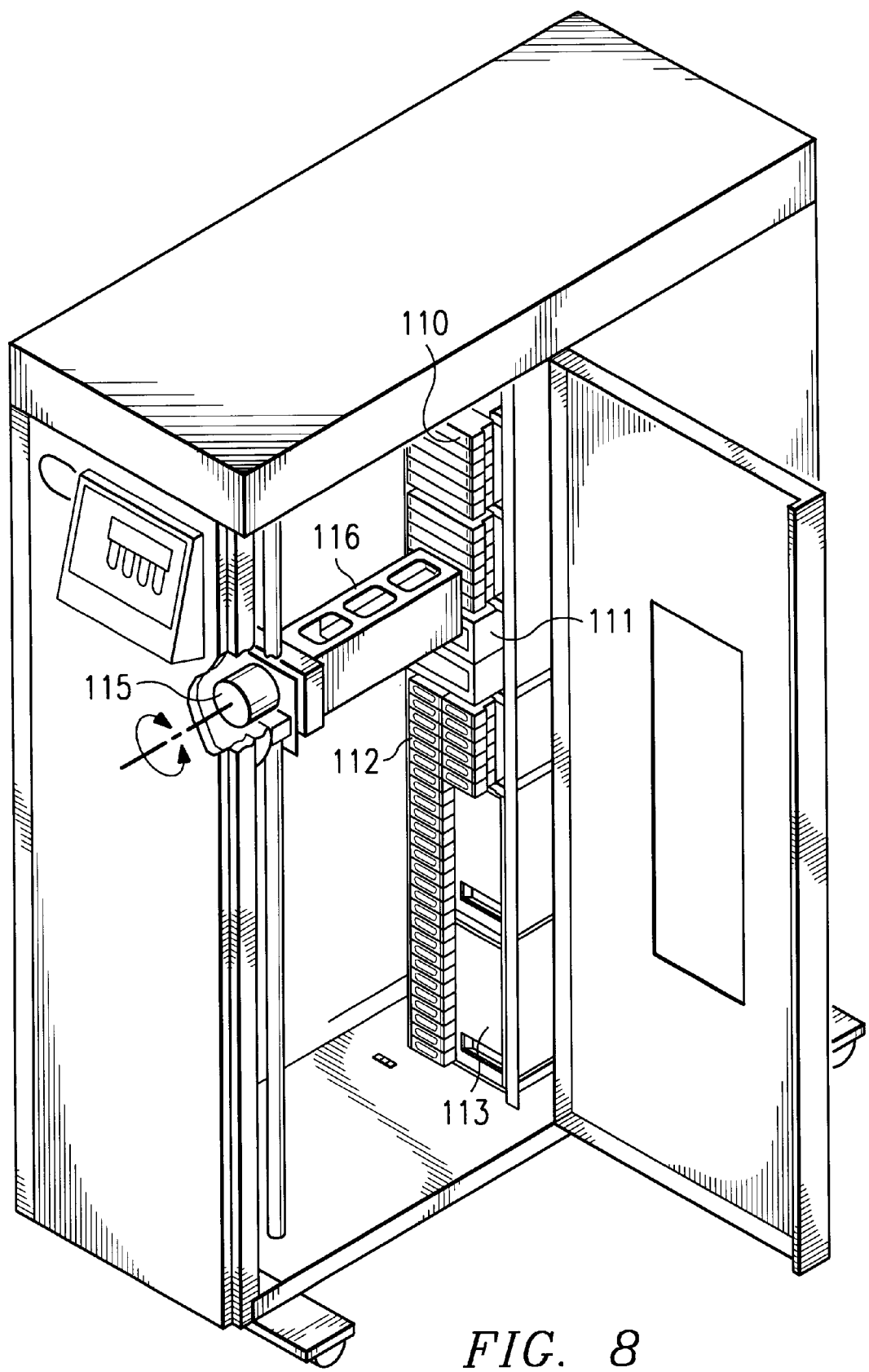
FIG. 8 is a partially cut away perspective view of a multi-sized media library of the present invention.

A perspective view of an embodiment of a multi-sized one column library in accordance with the present invention is illustrated in FIG. 8. Full sized cartridge storage cells 110, full sized drives 111, side-by-side small sized cartridge storage cells 112, and small sized drives 113 are shown stacked in the same column. Drives 113 are located in the "down oriented" side of the side-by-side cartridge storage cells. Flip motor 115 flips picker 116 between the position 25 "opposed" orientation to access drives 113 and the side-by-side small sized storage cells in the right hand side of the column, and the position 21 "first" orientation to access the side-by-side small sized storage cells in the left hand side of the column.

Figure 9:
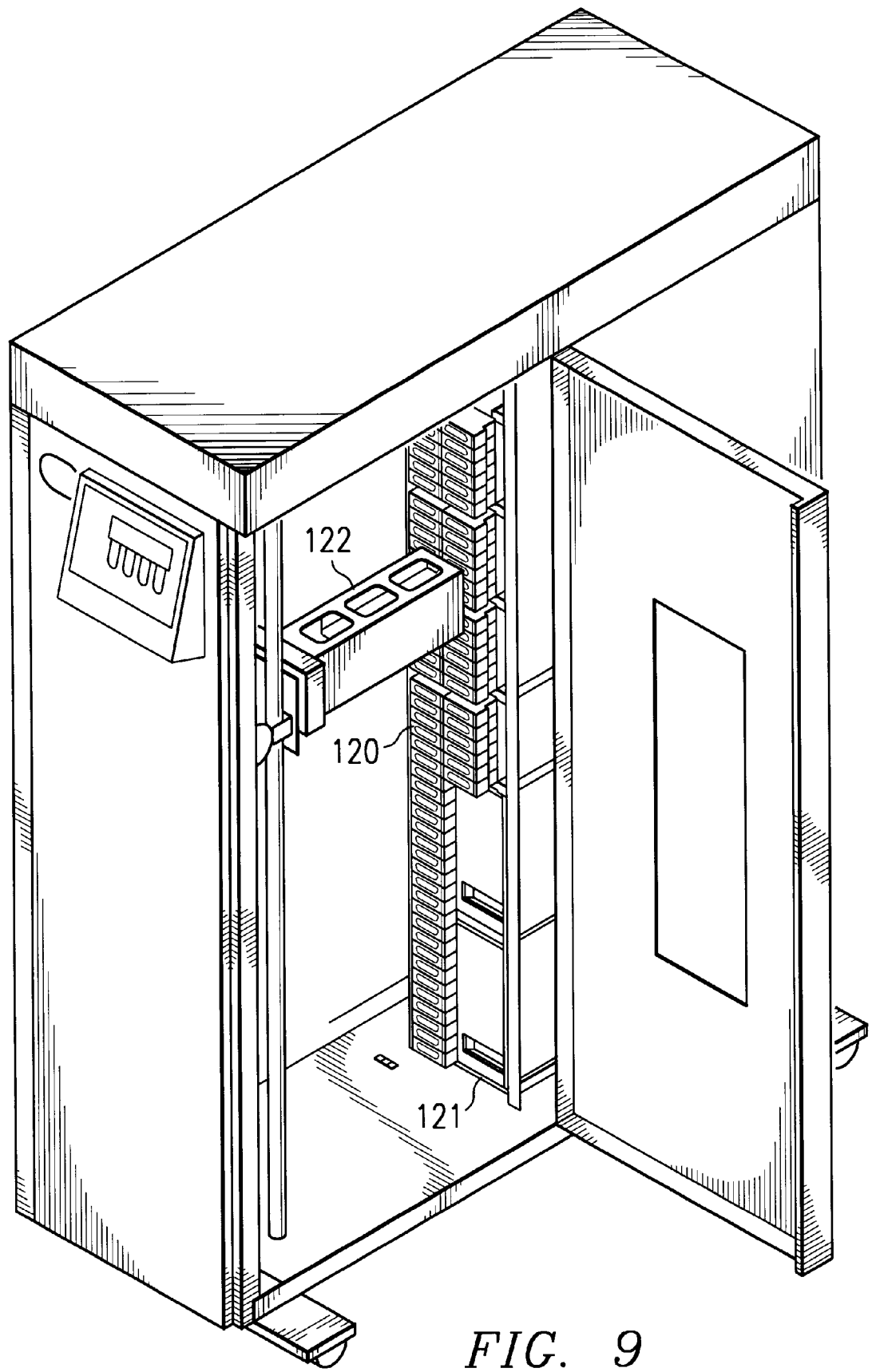
FIG. 9 is a perspective view of a single sized media library of the present invention.

A perspective view of an embodiment of a side-by-side one column library in accordance with the present invention is illustrated in FIG. 9. Side-by-side small sized cartridge storage cells 120 and small sized drives 121 are shown stacked in the same column. Drives 121 are located in the "down" oriented side of the side-by-side cartridge storage cells 120. A flip motor (not shown) flips picker 122 between the opposed or down orientation 25 to access drives 121 and the side-by-side small sized storage cells in the right hand side of the column, and first or up orientation 21 to access the side-by-side small sized storage cells in the left hand side of the column.

Figure 10A:
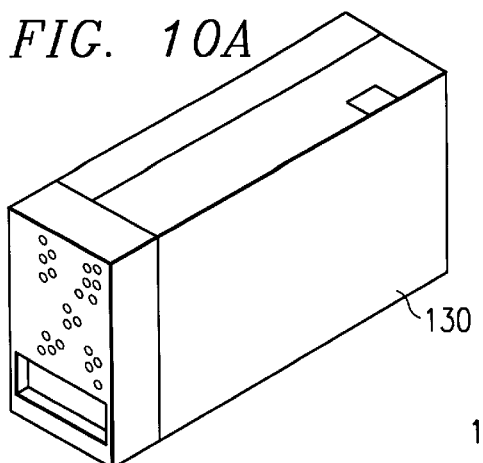
FIGS. 10A, B and C are perspective views of a tape drive, cells and media for use in the library of the present invention.
Figure 10B:
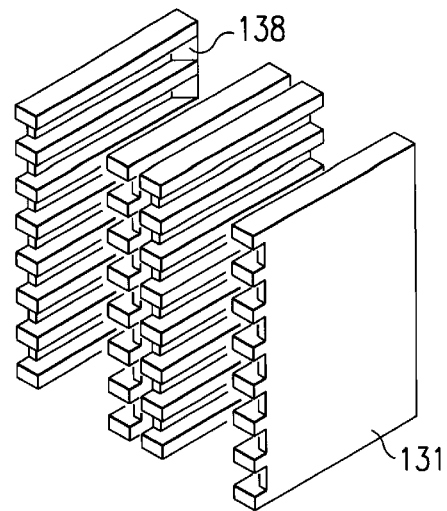
Figure 10C:
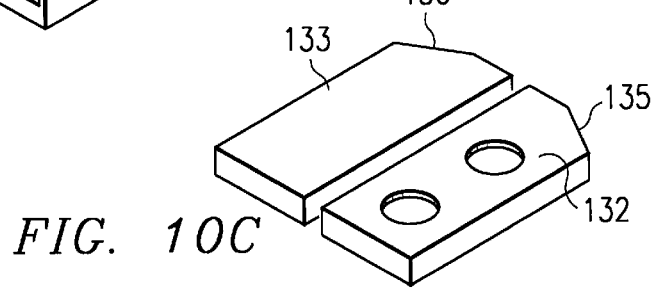

FIGS. 10A, 10B and 10C illustrate examples of small sized (tape) drives 130, storage cells 131 and cartridges 132 and 133 usable in the above-described libraries. The tape cartridges are shown in the down orientation 132 and the up orientation 133. The tape cartridges are provided with notches 135 and 136, which are on the same side of the cartridges. The notches mate with protrusions 138 of side-by-side storage cells 131 to insure that the cartridges 132 or 133 can only be inserted in the cells in the proper orientation.

Figure 11A:
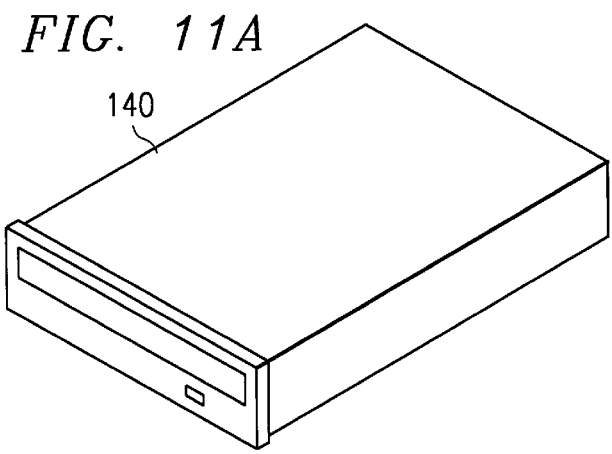
FIGS. 11A, B and C are perspective views of an optical drive, cells and media for use in the library of the present invention.
Figure 11B:
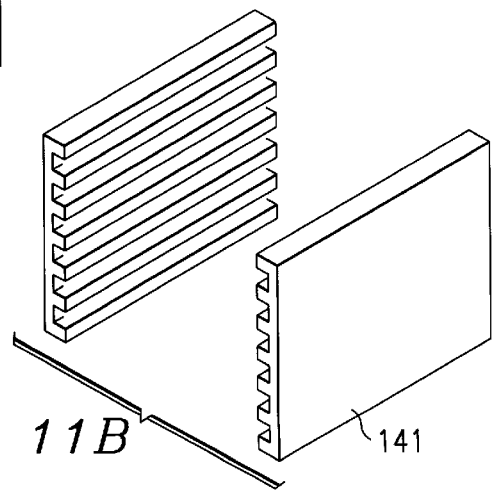
Figure 11C:
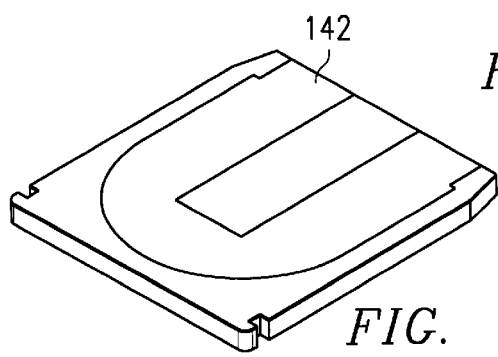

FIGS. 11A, 11B and 11C illustrate examples of large sized (optical) drives 140, storage cells 141 and cartridges 142 usable in the above-described libraries.

Figure 12:
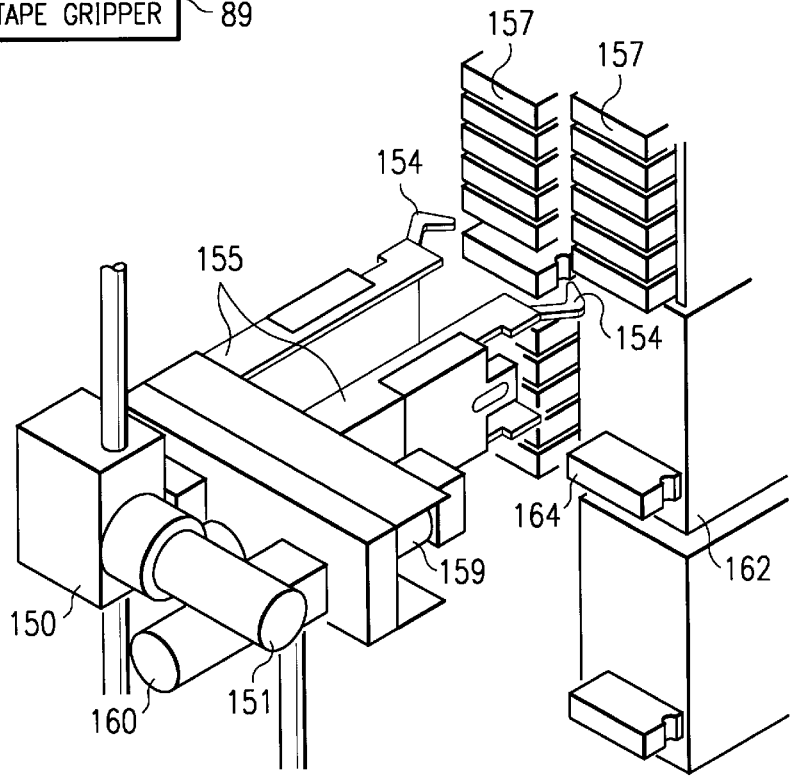
FIG. 12 is a perspective view of the picker assembly of the present invention.

An accessor picker mechanism of the present invention is illustrated in FIG. 12. Carriage 150 is moved in the vertical direction by motor 151 to the correct vertical position to allow small sized gripper 154 of picker 155 to access the addressed cartridge 157 in side-by-side storage cells. Horizontal movement motor 159 moves the gripper 154 toward or away from the storage cells to allow the gripper to access the cartridges. Flip motor 160 rotates the picker 155 180 degrees so that gripper 154 can access the cartridges on either side of the side-by-side cells, and to access small sized media read/write drives 162 to insert cartridges 164 for reading and/or writing in the drives, and to withdraw the cartridges upon the completion of reading and/or writing for transporting the cartridges 164 to the appropriate storage cells. A large sized gripper is substantially the same as gripper 154, except that the gripper is wider in order to access the wider large sized (optical) cartridges. Gripper 154 can be designed to open wider to allow for narrow or wide cartridges, eliminating the need to stack.

Although the terminology "column" has been used to describe the vertical organization of the library and the side-by side storage cells, the invention has equal applicability to a horizontally organized library, or a combination of vertical and horizontal.

While the preferred embodiments of the present invention have been illustrated in detail, it should be apparent that modifications and adaptations to those embodiments may occur to one skilled in the art without departing from the scope of the present invention as set forth in the following claims.

We claim:

1. A storage and retrieval library for multi-sized media comprising:

a column of storage cells for holding multi-sized media, at least a first type of said storage cells extending approximately the full width of said column for holding a large sized said media, and at least two of a second type of said cells arranged side-by-side in said column, each for holding a small sized said media; and a media picker having a first gripper for accessing said large sized media from said first type full width cells, and having a second gripper for accessing, when said picker is in a first position, said small sized media from one side of said second type of cells, said media picker rotatable about a pivot to an opposed position for said second gripper accessing said small sized media from the other side of said second type of cells.

2. The storage and retrieval library of claim 1, wherein:
the small sized media stored by said one side of said second type of side-by-side storage cells are stored in a first orientation; and
the small sized media stored by said other side of said second type of side-by-side storage cells are stored in a second orientation inverted from said first orientation.

3. The storage and retrieval library of claim 2:
additionally comprising at least one read/write drive for reading from and/or writing to said small sized media; and
said media picker delivers accessed small sized media to said read/write drive.

4. The storage and retrieval library of claim 3, wherein:
said at least one read/write drive is located in said one side of said column of cells of said second type.

5. The storage and retrieval library of claim 3, wherein:
said media picker pivot is centrally located with respect to said second type of side-by-side storage cells.

6. The storage and retrieval library of claim 3:
additionally comprising a controller responsive to addresses of said second type of side-by-side storage cells to operate said media picker to orient said second gripper in said first position or in said opposed position for storage and/or retrieval of said small sized media.

7. The storage and retrieval library of claim 6, wherein:
said cells in said one side of said side-by-side storage cells of said second type are provided with one family of addresses and said cells in said other side of said side-by-side storage cells of said second type are provided with another family of addresses.

8. The storage and retrieval library of claim 7, wherein:
said first type of said storage cells are provided with a third family of addresses.

9. The storage and retrieval library of claim 2, wherein:
said large sized media stored by said first type of full width storage cells are stored in either said first or said second orientation.

10. The storage and retrieval library of claim 9, wherein:
additionally comprising at least one first read/write drive for reading from and/or writing to said large sized media;
additionally comprising at least one second read/write drive for reading from and/or writing to said small sized media; and
said media picker delivers accessed large sized media to said first read/write drive, and delivers said small sized media to said second read/write drive.

11. The storage and retrieval library of claim 10, wherein:
said at least one first read/write drive occupies the full width of said column of storage cells; and
said at least one second read/write drive is located in said one side of said column of storage cells of said second type.

12. The storage and retrieval library of claim 10:
additionally comprising a controller responsive to addresses of said side-by-side storage cells of said second type to operate said media picker to orient said second gripper in said first position or in said opposed position for storage and/or retrieval of said small sized media.

13. The storage and retrieval library of claim 12, wherein:
said cells in said one side of said side-by-side storage cells of said second type are provided with one family of addresses and said cells in said other side of said side-by-side storage cells of said second type are provided with a second family of addresses, and said cells of said first type are provided with a third family of addresses.

14. A storage and retrieval library for multi-sized media comprising:
columns of storage cells for holding multi-sized media, at least a first type of said storage cells extending approximately the full width of a column for holding a large sized said media, and at least two of a second type of said cells arranged side-by-side in at least one of said columns, each of said second type of cells for holding a small sized said media; and a media picker having a first gripper for accessing said large sized media from said first type full width cells, and having a second gripper for accessing said small sized media from one side of said second type of cells when in a first position, said media picker rotatable about a pivot to an opposed position for said second gripper accessing said small sized media from the other side of said second type of cells, said media picker movable between said columns.

15. The storage and retrieval library of claim 14, wherein:

said small sized media stored by said one side of said second type of side-by-side storage cells are stored in a first orientation; and said small sized media stored by said other side of said second type of side-by-side storage cells are stored in a second orientation.

16. The storage and retrieval library of claim 15:

additionally comprising at least one first read/write drive for reading from and/or writing to said large sized media;

additionally comprising at least one second read/write drive for reading from and/or writing to said small sized media; and said media picker delivers accessed large sized media to said first read/write drive, and delivers said small sized media to said second read/write drive.

17. The storage and retrieval library of claim 16, wherein:

said at least one first read/write drive occupies the full width of a column of said storage cells; and said at least one second read/write drive is located in said one side of a column of said storage cells of said second type.

18. The storage and retrieval library of claim 16:

additionally comprising a controller responsive to addresses of said side-by-side storage cells of said second type to operate said media picker to orient said second gripper in said first position or in said opposed position for storage and/or retrieval of said small sized media.

19. The storage and retrieval library of claim 18, wherein:

said cells in said one side of said side-by-side storage cells of said second type are provided with one family of addresses and said cells in said other side of said side-by-side storage cells of said second type are provided with a second family of addresses, and said cells of said first type are provided with a third family of addresses.

20. The storage and retrieval library of claim 15, additionally comprising:

a protrusion in each of said side-by-side storage cells of said second type for mating with corresponding notches in said small sized media for orienting said small sized media in said storage cells of said second type.

* * * * *